United States Patent [19]

Weis

[11] 3,941,698

[45] Mar. 2, 1976

[54] GRIT SELECTOR

[75] Inventor: Frank G. Weis, Kansas City, Mo.

[73] Assignee: Ecodyne Corporation, Lincolnshire, Ill.

[22] Filed: May 8, 1975

[21] Appl. No.: 575,853

Related U.S. Application Data

[63] Continuation of Ser. No. 443,667, Feb. 19, 1974, abandoned.

[52] U.S. Cl. ............... 210/208; 210/219; 210/257 R; 210/258; 210/262; 210/319; 210/512 R
[51] Int. Cl.² ........................................ B01D 21/26
[58] Field of Search ....... 210/63, 84, 152, 170, 171, 210/173, 202, 207, 208, 219, 257, 258, 262, 319, 512, 520, 523; 261/124; 209/169

[56] References Cited
UNITED STATES PATENTS

| | | | |
|---|---|---|---|
| 2,308,670 | 1/1943 | Bolton | 210/512 |
| 3,210,053 | 10/1965 | Boester | 210/208 |
| 3,567,633 | 3/1971 | Valdespino | 210/84 |
| 3,630,372 | 12/1971 | Weir et al. | 210/207 |
| 3,695,439 | 10/1972 | Dupre | 210/207 |
| 3,837,493 | 9/1974 | Lin | 210/208 |

Primary Examiner—Charles N. Hart
Assistant Examiner—F. F. Calvetti
Attorney, Agent, or Firm—Joel E. Siegel

[57] ABSTRACT

A grit selector having an upper settling chamber and a lower grit storage chamber. The settling chamber communicates with the storage chamber through a relatively small opening in a flat transition surface therebetween. Rotating paddles critically positioned within the settling chamber cause the flow of liquid entering the settling chamber adjacent the outer periphery to rotate about the chamber in a forced vortex having upward spiral flow. Settled grit attaches to the transition surface at the settling chamber perimeter before one revolution. The spiral flow urges the grit across the transition surface towards the opening while the organics are lifted upward and back into the flow. The grit drops through the opening into the grit storage chamber and the organics are carried out of the settling chamber through an outlet passageway. A unique air scour arrangement is provided to remove any organic material which has settled in the grit storage chamber and an air lift is provided to remove the settled grit from the grit storage chamber.

10 Claims, 4 Drawing Figures

GRIT SELECTOR

This is a continuation, of application Ser. No. 443,667, filed Feb. 19, 1974, now abandoned.

BACKGROUND OF THE INVENTION

The present invention relates to a grit selector or trap for selectively catching grit of all sizes desired and passing all organics into a waste treatment plant.

Grit is one of the most unpredictable and difficult materials a sewage treatment plant must handle. Grit can be defined as the heavy mineral matter present in sewage. It is principally made up of sand and soil, but frequently contains cinders, coffee grounds, seeds, corn, and other coarse sediment which reaches a sewage disposal plant. It is desirous to remove this material as it cannot be treated, reduced in size, or eliminated by treatment methods. It presents a problem to waste treatment as it is hard and abrasive. It wears pumps and other mechanical devices. It is heavy and accumulates in clarifiers, treatment basins, digesters, etc., where it must often be removed by hand.

This problem has been apparent for years. In conventional grit removal devices, control of sewage velocity is utilized to remove the grit. The basins are generally long and narrow and have some type of velocity controlling outlet. The problem of selective removal of grit particles is complicated by fluctuations in rate of flow, especially those that accompany storm rainfalls. Aside from subdividing the grit chamber into several compartments that can be taken in and out of service, a solution to the velocity problem is sought by combining opportunity for sedimentation of wanted particles with scour or resuspension of unwanted particles. This requires the provision of adequate surface area and maintenance of an adequate displacement velocity. Fluctuations in flow require, ideally, that both (1) a constant value of Q/A and (2) a constant displacement velocity V be maintained in the chamber. Ordinarily a compromise solution is offered in order to keep the required structure simple. The cross-section of the chamber at right angles to the direction of flow is made uniform throughout its length, and its shape is so chosen that the displacement velocity is held substantially constant at all depths of flow. For this purpose, a flow control device, such as a proportioned flow weir, a vertical throat, or a standing wave flume, may be placed at the end of the chamber. The velocity at maximum flow is then made large enough to ensure deposition of wanted large and heavy particles, and selective movement and resuspension of smaller and lighter particles which will settle as flow is reduced, being cared for by the constant scouring action of the flowing water.

Once the grit has settled in the chamber, some type of removal procedure must be provided. Many of the older plants employed hand or manually cleaned grit chambers. Most plants of more recent design provide some type of continuous mechanical collection of the grit. Chain and scraper, bucket conveyors, and circular scraper mechanisms have been utilized.

There are many significant disadvantages of the types of conventional grit chambers discussed above. It is difficult to control the velocity through the grit chamber and this results in deposition of unwanted organic matter and possibly a wash through of some grit. This means many organics are settled out that could be treated by various means. It also means the grit cannot be disposed of readily because of its pollution load. Conventional grit chambers further have grit removal systems which include collection mechanisms (i.e., chains, buckets, bearings) below the water surface in a high abrasion atmosphere. Another drawback of conventional grit chambers is their large size.

SUMMARY OF THE INVENTION

It is a primary object of the present invention to provide a grit selector which more efficiently eliminates all other particles than heretofore known devices, even though they have the same settling rate as the grit.

Another object of the invention is to provide a grit selector which operates efficiently even when velocities through the device are varying.

A further object of the invention is to provide a grit selector which includes an air scour which does not cause grit to be carried back into the treatment plant.

A still further object of the invention is to provide a grit selector which removes the grit by a lift having no moving parts.

These and other objects are realized in accordance with the present invention by providing a grit selector having an upper settling chamber and a lower grit storage chamber. The settling chamber, being of large diameter, communicates with the storage chamber through a relatively small opening in a flat transition surface therebetween. Rotating paddles critically positioned within the settling chamber, a short distance above the transition surface, cause the flow of liquid entering the settling chamber adjacent the outer periphery to rotate about the chamber. The velocities are maintained more or less constant, no matter what the flow rate by the rotating paddles. A spiral circulation is achieved in the chambers because of the hydraulics involved. The flow in the settling chamber is kept near laminar so the grit can settle readily. Settled grit attaches to the transition surface at the settling chamber perimeter before one revolution. The spiral flow urges the grit and organics of similar settling velocity across the transition surface towards the opening. The paddles are uniquely positioned to provide sufficient extra velocity to lift the larger sized organics upward and back into the flow while the grit continues to move towards the middle and drops through the opening, into the storage chamber. The upward moving organic particles are carried upward and out of the settling chamber through an outlet passageway.

As no device is perfect, some small amounts of organic material will accumulate in the grit within the storage chamber. To remove this organic material, the grit is lightly air scoured prior to removal. This brings all organics into the settling chamber where they are returned to the flow. The unique manner of air scour provided by the present invention precludes grit particles from being lifted out of the storage chamber. To remove the grit from the storage chamber, it is air lifted to a point above the unit by an air lift having no mechanical parts below the liquid surface which might cause maintenance problems.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein.

DESCRIPTION OF A PREFERRED EMBODIMENT

Figure 1:
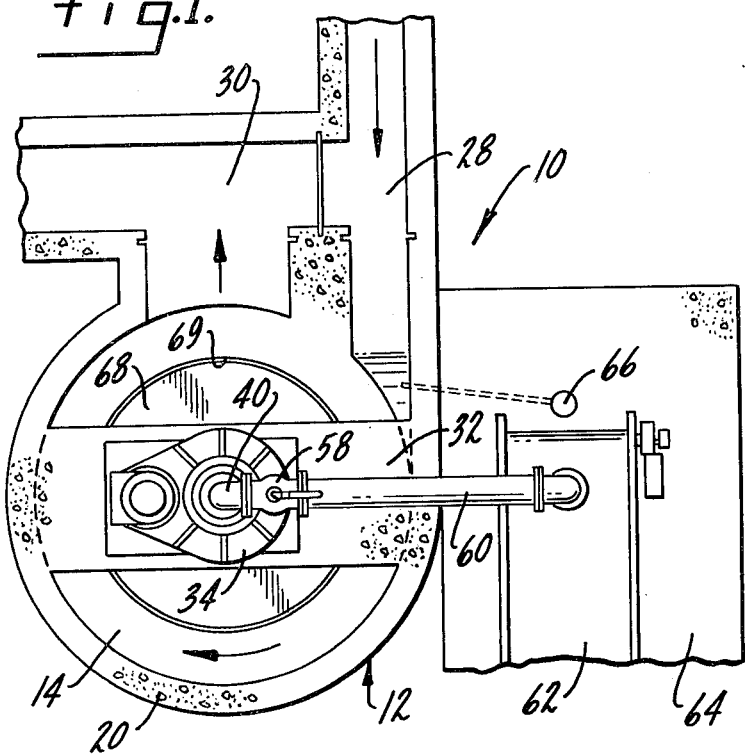
FIG. 1 is a top plan view of a grit separator constructed in accordance with the present invention.
Figure 2:
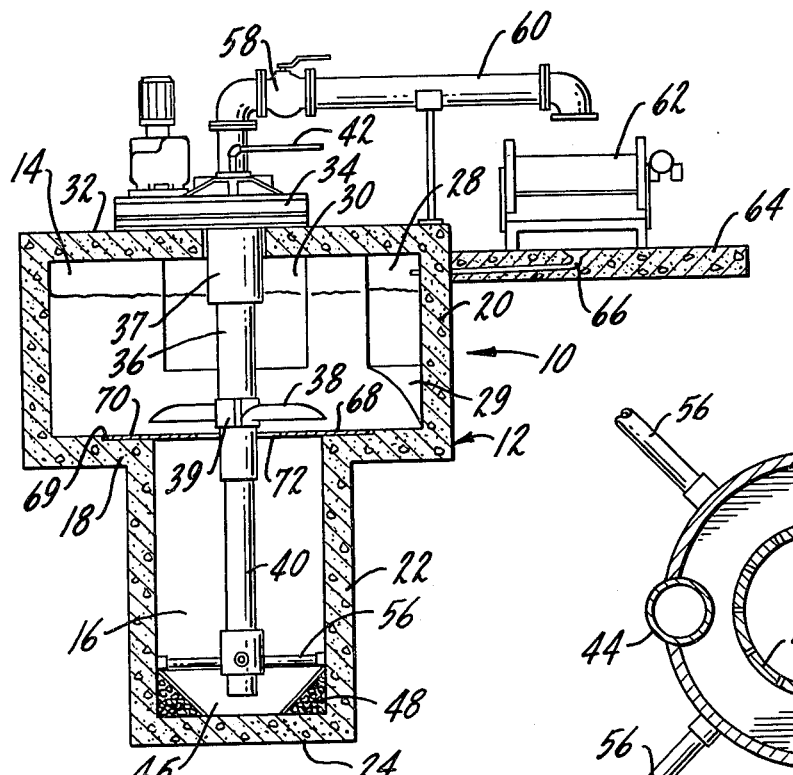
FIG. 2 is a vertical sectional view of the grit separator illustrated in FIG. 1.

Referring to FIGS. 1 and 2, the grit selector is indicated generally at 10. Grit selector 10 comprises a housing or tank 12, which may be constructed of any suitable material, such as concrete. The tank 12 defines a cylindrical settling chamber 14 and a cylindrical grit storage chamber 16 of smaller diameter positioned concentric therewith and immediately therebelow. Storage chamber 16 is open at its upper edge and communicates with settling chamber 14 through an annular floor 18. Floor 18 is in contact with the lower peripheral edge of the vertical wall 20 defining settling chamber 14 at its outer peripheral edge and the upper peripheral edge of the vertical wall 22 defining storage chamber 16 at its inner peripheral edge. Floor 24 closes off the bottom of storage chamber 16.

An inlet trough 28 is provided in fluid communication with the interior of chamber 14 tangent to the outer periphery thereof. Inlet trough 28 has a floor 29 which slopes downward and outward towards the wall 20. An outlet trough 30 is provided in fluid communication with a portion of the interior of chamber 14 spaced from the section in communication with the inlet trough 28 by approximately 270°. Inlet trough 28 and outlet trough 30 extend down into chamber 14 to a depth approximately equal to 75% of the depth of the chamber.

Extending diametrically across the top of chamber 14 is an equipment support platform 32. A motor and gear box assembly 34 of conventional construction is supported on top of platform 32 for rotation of a hollow shaft or sleeve 36 which extends centrally downward into chambers 14 and 16. An air bell 37 is provided concentric with sleeve 36 to prevent liquid from rising into assembly 34. Secured to sleeve 36 for rotation therewith are paddle type propeller blades 38 affixed to a paddle hub 39.

Figure 3:
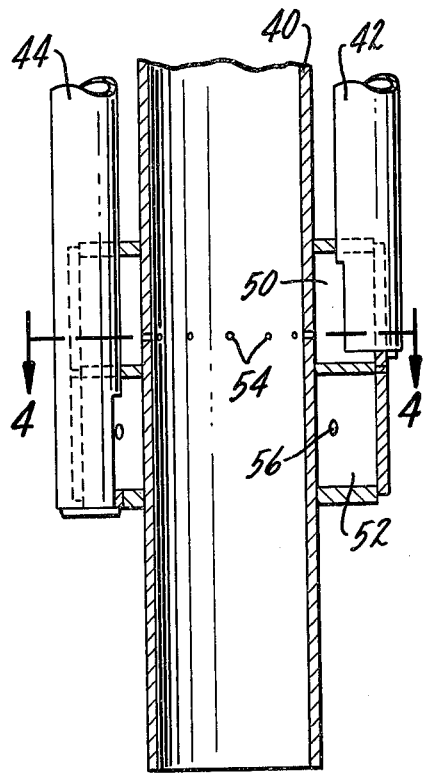
FIG. 3 is an enlarged elevational view of a portion of the air distribution system in accordance with the present invention.
Figure 4:
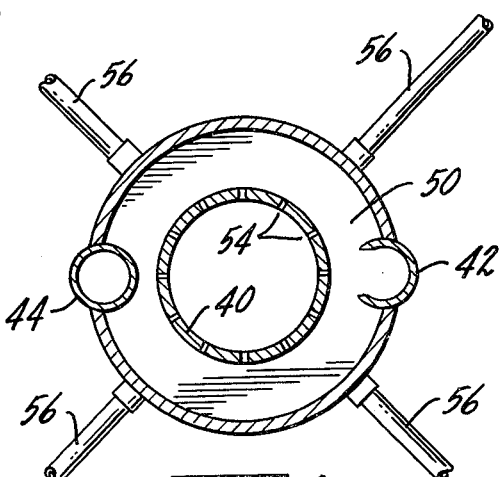
FIG. 4 is a sectional view taken along line 4—4 in FIG. 3.

Referring to FIGS. 2-4, an air lift discharge pipe 40 and a pair of air pipes 42 and 44 extend downward through assembly 34 and sleeve 36 towards the bottom of chamber 16. The lower end of discharge pipe 40 is positioned a short distance above the floor 24 of chamber 16 within a grit receiving area 46 defined by a 45° fill area 48 around the periphery of floor 24. A pair of annular air receiving chambers 50 and 52 are defined around pipe 40 a short distance above the lower end thereof. The lower end of air pipe 42 is in fluid communication with air chamber 50 which in turn is in fluid communication with the inside of pipe 40 through a plurality of openings 54 formed circumferentially around pipe 40. The lower end of air pipe 44 is in fluid communication with air chamber 52 which in turn is in fluid communication with a plurality of air distributing steady arms 56 which extend radially outward from chamber 52 for contact with the wall 22 of chamber 16. Steady arms 56 have openings (not shown) in the bottom sides thereof which permit air to exit therefrom.

The upper end of discharge pipe 40 is secured to a control valve 58 for control of flow therethrough and an extension pipe 60 to deliver the lifted material onto a corra-trough conveyor 62 of well known construction. Conveyor 62 is supported on a platform 64 having a drain pipe 66 provided therein to direct liquid back into the inlet trough 28. The upper ends of air pipes 42 and 44 are suitably connected to a conventional source of compressed air (not shown).

An annular plate 68 is received within a recess 69 formed in floor 18 so as to define a flat transition surface 70 which includes the upper surfaces of plate 68 and floor 18. Plate 68 extends across the upper edge of wall 22 and has an opening 72 therein which is sized to permit sleeve 36 to pass therethrough and define an annular passage around sleeve 36. The spacing of paddle blades 38 above plate 68 forms an important part of the invention and will hereinbelow be discussed in further detail.

A discussion of the theory of operation of grit selector 10, which hereinbelow follows, brings out, in addition to the method and theory of operation, a disclosure of various optimum space relationships which optimizes performance. Water or sewage from which grit is to be removed is introduced into settling chamber 14 through inlet trough 28. The diameter of settling chamber 14 is preferably sized to give 30 seconds retention at design flow. At peak flow, the retention should be around twenty seconds and at low flow, the retention should be approximately 100 seconds. At high flows, the dimensions of the outlet trough 30 are such that the liquid level in chamber 14 will rise so the volume gives 20 seconds retention even though the flow therethrough may be twice the design flow or greater. The rotation of paddle blades 38 within chamber 14 adds rotational energy to cause the liquid in chamber 14 to rotate at a velocity of 1 ft. per second. The entry of liquid into chamber 14 through inlet trough 28 is designed to give an entry velocity of 2 ft. per second no matter what the flow rate, which is sufficient energy to overcome the frictional resistance of the revolving contents and keeps the contents moving at the 1 ft. per second velocity. The flow is laminar and not turbulent. The Reynolds number will be below 1,200 which keeps the flow laminar. Since turbulent flow inhibits settling, the flow velocity must be kept below the turbulent range.

As the liquid rotates around chamber 14 in the direction indicated by the arrow in FIG. 1, grit and certain organics settle towards the bottom of chamber 14 onto transition surface 70. It should be noted that floor 29 of inlet trough 28 slopes downward and outward which results in an increasing depth in trough 28 in proportion to the distance between the point of entry into chamber 14 and the outlet trough 30. Since particles start to settle within trough 28, this allows for equal settling time for particles which enter the chamber 14 at any point along the inlet trough 28. The grit being small and having a high density, settles at the same rate as some organics which are larger in diameter but have a lower density. Particles settle according to the following formula:

$$v = \frac{2}{g} a^2 g \frac{ps-p}{u}$$

Where:

$v$ = settling velocity (cm/sec.)
$a$ = radius (cm)
$g$ = gravity (cm/sec.$^2$)
$ps$ = density of solid
$p$ = density of fluid
$u$ = coefficient of viscosity As can be seen, a particle settles at a rate proportional to the radius squared and linearly as to the density. As an example, feces about ¾ inch in diameter, corn and small particles of grit all settle at the same rate. This means that all of these particles will accumulate on the transition surface 70.

The liquid rotates within chamber 14 as a forced vortex. In a forced vortex, all of the liquid is moving as a mass. The outer periphery liquid having a higher head tends to flow down the wall 20 and move towards the central axis of chamber 14 across the transition surface 70. This results in what can be called an upward spiral flow. It is this upward spiral flow which urges the settled particles across surface 70 toward the opening 72. The positioning of paddle blades 38 in chamber 14 is critical in achieving this upward spiral flow. In accordance with the present invention, the distance from the middle of the paddle blades 38 to the surface 70 should be within the following range.

$$D = \text{¾ to ⅞} \left[ X - \left(\frac{Q}{B}\right)^{2/3} \right]$$

Where:
$D$ = distance from middle of blades 38 to surface 70 (ft.)
$X$ = height of liquid at maximum flow (ft.)
$Q$ = maximum flow rate (cu. ft./sec.)
$B$ = outlet width (ft.)

Additionally, the paddle blades should turn at a speed slightly in excess of the liquid rotation speed to increase the upward velocity of the liquid flow. This difference is such as to not agitate the liquid and cause turbulent flow.

The Stokes equation for settling is $R = K(6 u a v_s)$.
Where:
$R$ = resistance to settling (grams)
$K$ = correction factor
$u$ = viscosity
$a$ = radius (cm)
$v_s$ = velocity of settling (meters/sec.)

$K$ varies as the solid approaches the bottom by $K = 1 + 9a/8s$ where $s$ is the distance from the bottom. A solid settles towards or moves away from the bottom in this manner. Since the grit particles have a smaller $a$ than the organic particles, they will more readily attach to the surface 70, than the organic particles. Thus, the larger organic particles, which initially settle on the surface 70, are caught up in the upward spiral flow of the liquid, while the grit is carried on across the surface 70 to opening 72 and is deposited therethrough into chamber 16. The diameter of opening 72 is preferably maintained at about 6 inches larger than the diameter of sleeve 36. The upward moving organic particles are carried upward and leave chamber 14 in the accompanying liquid flow through outlet trough 30.

The lifting force on a particle moving along a surface is:

$$F_L = C_L d^2 \frac{p u_b^2}{2}$$

Where:
$F_L$ = lifting force
$C_L$ = coefficient of lift
$d$ = particle diameter
$p$ = liquid density
$u_b$ = fluid velocity on surface It is apparent that the smaller diameter grit has a smaller lifting force than the larger diameter organic particles, which permits the organic particles to be lifted, while the grit particles remain on surface 70. It is also apparent that by controlling the velocity of the liquid on the surface 70, the relative size of the grit selected for removal may be varied.

Ideally, all of the organic particles will be caught in the upward flow of liquid and removed via trough 30, while all of the grit particles are delivered through opening 72 into storage chamber 16. However, since no system operates at 100% efficiency, there will be a minimum of organics interspersed amongst the grit which has settled to the bottom of chamber 16 and collected in grit receiving area 46. To rid the grit of these organics, an air scour is provided. With the control valve 58 remaining closed, pressurized air is periodically pumped down pipe 44 into air lift chamber 52. The air is then forced out the openings in steady arms 56 to gently air wash and lift the grit particles and thereby wash out the organic particles. The air scour is sufficient to cause only the organic particles to rise within chamber 16 towards opening 72, while the grit particles remain at the bottom of chamber 16. As the organics reach opening 72, the increase in velocity of air through the small opening carries them therethrough and rapidly up into the spiral liquid flow in chamber 14 where they are carried into the outlet trough 30.

When the air scour is completed and the supply of air through pipe 44 is shut off, the control valve 58 is opened and pressurized air is caused to flow down pipe 42 through openings 54 into pipe 40. This causes the grit to be air lifted from grit receiving area 46 up through pipe 40 and past valve 58 into pipe 60 for delivery onto conveyor 62. The liquid drained from conveyor 62 is returned to the inlet trough 28 through drain pipe 66.

The unique combination of structural elements and their space relationship to one another as hereinabove described results in a grit selector for selectively catching grit which operates more efficiently than heretofore known devices. Grit selector 10 operates efficiently even when velocities through the device are varying. A unique air scour system is provided which does not cause grit to be carried back into the treatment plant. An air lift is also provided to remove the grit from the settling device which has no moving parts to cause maintenance problems.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. Apparatus for separating out grit from liquid sewage while retaining organic solids therein, comprising: a cylindrical settling chamber; a cylindrical grit storage chamber, having a smaller diameter than said settling chamber, disposed immediately below said settling chamber; a substantially flat transition surface separating said settling chamber and said storage chamber, said transition surface having a centrally disposed opening therethrough permitting communication between said settling chamber and said storage chamber; inlet means for introducing liquid sewage into an upper portion of said settling chamber along the outer periphery thereof, outlet means for removing grit free liquid from an upper portion of said settling chamber along the outer periphery thereof, said outlet means being spaced from said inlet means by a distance equal to a substantial portion of the circumference of said settling chamber in the direction of liquid flow; said liquid flow having a flow velocity in the laminar range; and paddle means mounted within said settling chamber for rotation about a substantially verticla axis, said paddle means being positioned a short distance above said transition surface opening and rotated at a sufficient rate for causing the liquid within said settling chamber to rotate as a forced vortex resulting in an upward spiral flow which urges the settled particles across said transition surface toward said opening and causes said grit to fall through said opening into said storage chamber and said organic particles to rise in said spiral flow.

2. Apparatus as defined in claim 1 further including a substantially vertical air lift tube means extending from said settling chamber through said opening into said storage chamber for removing grit from the bottom of said storage chamber.

3. Apparatus as defined in claim 2 further including a plurality of substantially horizontal air scour arms extending radially outward from said air lift tube means for providing air scour through openings formed therein to the grit settled on the bottom of said storage chamber so as to separate organic material from the grit.

4. Apparatus as defined in claim 3 further including an air lift chamber formed concentrically around said air lift tube means within said storage chamber, said air lift chamber being in communication with a source of pressurized air, and a plurality of circumferentially spaced openings passing through said air lift tube means permitting pressurized air from said air lift chamber to pass into said air lift tube.

5. Apparatus as defined in claim 3 further including an air scour chamber formed concentrically around said air lift tube means within said storage chamber, said air scour chamber being in fluid communication with a source of pressurized air and with said air scour arms.

6. Apparatus as defined in claim 2 wherein said paddle means is secured to a sleeve mounted concentric with and for rotation about said air lift tube means.

7. Apparatus as defined in claim 5 wherein said air scour arms contact the side wall of said settling chamber to steady said air lift tube.

8. Apparatus as defined in claim 7 wherein said storage chamber has a centrally located grit settling area defined within a fill area around the lower periphery of said storage chamber.

9. Apparatus as defined in claim 6 wherein said transition surface includes a transition plate positioned in covering relationship to said storage chamber, said transition plate having a centrally disposed opening to receive said sleeve therethrough and define an annular opening therebetween for passage of said grit into said storage chamber.

10. Apparatus as defined in claim 9 wherein the distance ($H$) measured in feet from the center line of the middle of said paddle means to said transition surface is in the range $H = 3/4$ to $7/8$ $$\left[ X - \left(\frac{Q}{B}\right)^{2/3} \right],$$

where $X$ = height of water in said settling chamber at maximum flow measured in feet, $Q$ = maximum flow rate through said settling chamber measured in cubic feet per second, and $B$ = the width of said outlet means measured in feet.

* * * * *

UNITED STATES PATENT AND TRADEMARK OFFICE
CERTIFICATE OF CORRECTION

PATENT NO. : 3,941,698
DATED : March 2, 1976
INVENTOR(S) : Frank G. Weis

It is certified that error appears in the above–identified patent and that said Letters Patent are hereby corrected as shown below:

In column 2, line 24 delete "large" and insert --larger--.

In column 4, line 65 delete the formula $v = \frac{2}{g} a^2 g \frac{ps-p}{u}$ and insert $v = \frac{2}{9} a^2 g \frac{ps-p}{u}$ Signed and Sealed this Seventh Day of September 1976

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,941,698

DATED : March 2, 1976

INVENTOR(S) : Frank G. Weis

It is certified that error appears in the above-identified patent and that said Letters Patent is hereby corrected as shown below:

Column 5, line 28 the formula should read as follows:
$$D = 3/4 \text{ to } 7/8 \left[ X - \left(\frac{Q}{B}\right)^{2/3} \right]$$

Column 8, line 35 the formula should read as follows:
$$H = 3/4 \text{ to } 7/8 \left[ X - \left(\frac{Q}{B}\right)^{2/3} \right]$$

Signed and Sealed this

Twenty-eighth Day of February 1984

[SEAL]

Attest:

GERALD J. MOSSINGHOFF

Attesting Officer     Commissioner of Patents and Trademarks